United States Patent [19]

Andrews, Jr. et al.

[11] 3,958,214

[45] May 18, 1976

[54] ENCODED ECHO-RANGING SIGNAL GENERATOR

[75] Inventors: Daniel E. Andrews, Jr.; William E. Klund; Robert D. Isaak, all of San Diego, Calif.

[73] Assignee: The United States of America as represented by the Secretary of the Navy, Washington, D.C.

[22] Filed: July 19, 1963

[21] Appl. No.: 296,413

[52] U.S. Cl. .................... 340/3 A; 178/22; 325/122; 343/17.1 R
[51] Int. Cl.² ............... G01S 9/66; H04K 1/00
[58] Field of Search ......... 178/22; 331/78; 328/37, 328/43; 343/17.1; 325/32, 122; 340/3 A, 5 R

[56] References Cited
UNITED STATES PATENTS

| | | | |
|---|---|---|---|
| 2,768,372 | 10/1956 | Green | 343/17.1 |
| 2,845,489 | 7/1958 | Johnson et al. | 328/43 |
| 2,922,985 | 1/1960 | Crawford | 328/37 |
| 2,951,230 | 8/1960 | Cadden | 328/37 |
| 2,984,789 | 5/1961 | O'Brien | 328/43 |

*Primary Examiner*—Richard A. Farley
*Attorney, Agent, or Firm*—R. S. Sciascia; G. J. Rubens; T. M. Phillips

EXEMPLARY CLAIM

1. An encoded echo-ranging signal generator comprising in combination;
    a digital shift register having a plurality of binary encoded stages,
    a shift pulse generator coupled to said digital shift register for the timely shifting thereof,
    an anti-coincidence circuit having a pair of inputs and an output with one of said inputs being connected to a predetermined stage of said digital shaft register and the other input thereof coupled to the output of said digital shift register and with the output thereof connected to the input of said digital shaft register, to randomly recirculate through said register the binary contents of said encoded stages,
    an echo-ranging system coupled to the output of said digital shift register,
    and a digital message encoder coupled to said digital shift register for the respective binary bit encoding of each stage thereof.

20 Claims, 6 Drawing Figures

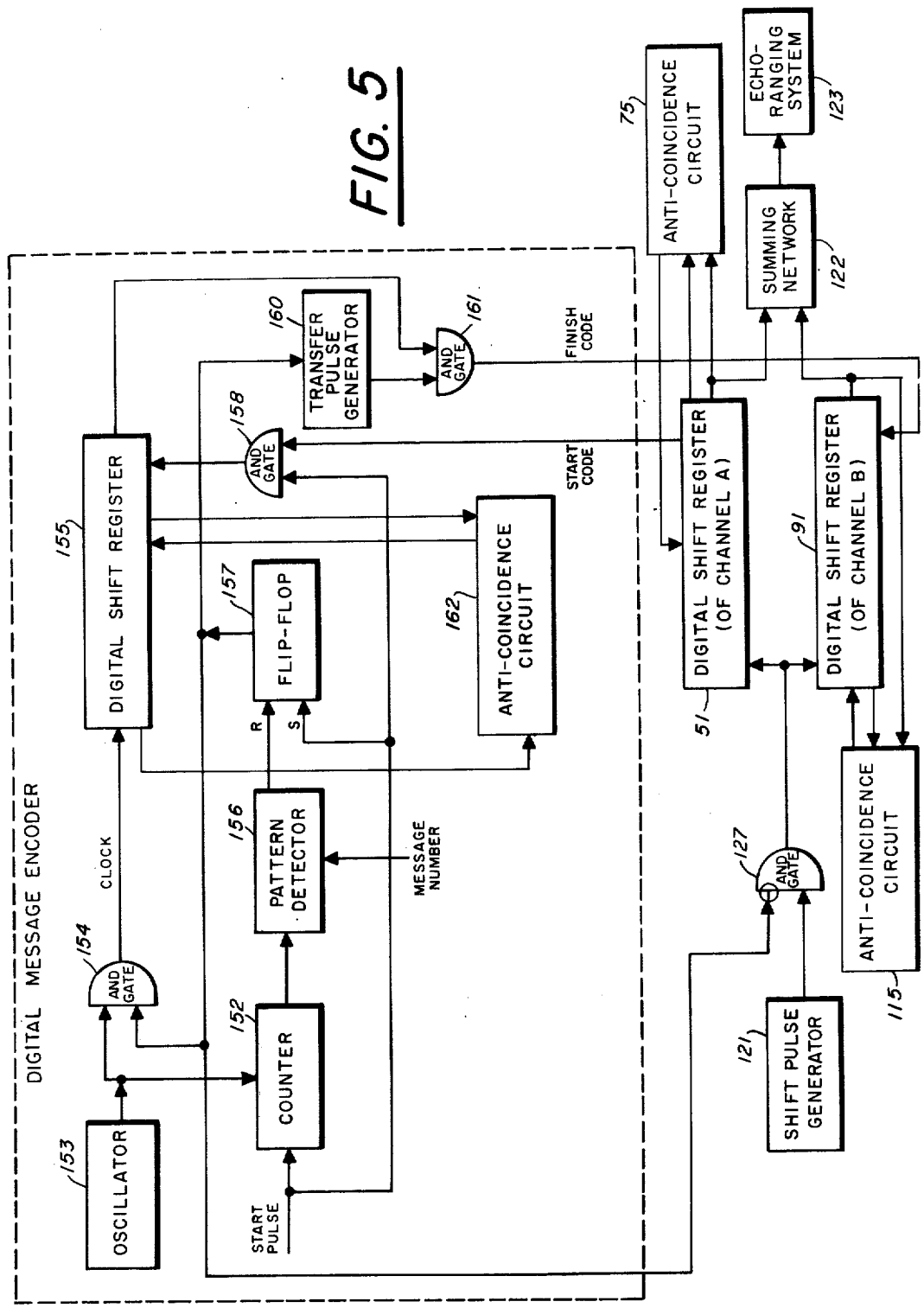

ENCODED ECHO-RANGING SIGNAL GENERATOR

The invention described herein may be manufactured and used by or for the Government of the United States of America for governmental purposes without the payment of any royalties thereon or therefor.

The present invention relates generally to communication systems and in particular is a secure communication system in which an intelligence signal is broadcast in coded form throughout a predetermined environmental medium for intended utilization only by receivers equipped for the decoding thereof. In more particular, the subject invention is a method and means for cryptographically encoding the echo-search signal of a sonar set with programmed intelligence information which may be communicated readily and secretly between friendly vessels while an enemy target vessel is being echo-ranged upon at the same time by said echo-search signal.

In the past, it has been known to mask transmitted intelligence signals with various and sundry types of noise in an effort to disguise them so that any enemy eavesdropper would be deceived into thinking that they are sounds from natural causes in any given habitate or communication medium. Thus, in sonar operations, fish or other such noises, for example, have been employed as the masking noises for many of the prior art secure communication systems.

In addition, it has been known to modulate transmitted intelligence signals with one or more disturbing oscillatory signals within the whole frequency band of the human voice, as well as other frequency bands, while maintaining the amplitude thereof only slightly higher than the maximum amplitude of transmitted intelligence signals.

Also, use of suppressed-signal modulators have been employed as suppressed carrier modulators for the purpose of encoding transmitted intelligence signals during secret or secure communications operations.

While useful for many practical purposes, the aforementioned signal and coding devices still leave a great deal to be desired in the cryptographic communications field, in that they are quite susceptible to being decoded by an enemy interrogator while they are being employed in conjunction with underwater, atmospheric, or space communication operations.

The instant invention overcomes considerably the disadvantages of the prior art devices, inasmuch as the encoding of a transmitted intelligence signal may be made so complex that it is practically impossible to decode it without having the appropriate decoding equipment having the key thereto. Moreover, encoding is accomplished simply and easily, and changes are facilitated without elaborate equipment changes being necessary. Furthermore, the present invention is particularly advantageous in the sonar, radar, or other echo-ranging fields because the encoded broadcast signals may be simultaneously used as both a communication signal and an echo-search signal, thereby performing two important functions at the same time without one having any adverse effect on the other.

It is, therefore, an object of this invention to provide an improved method and means for generating a cryptographic communications signal.

Another object of this invention is to provide a method and means for generating a unique encoded signal that may be simultaneously used as a secure communication signal and target-ranging signal without one adversely interferring with the other.

Still another object of this invention is to provide a method and means for broadcasting a communication-echo-ranging sonar signal that has a random noise appearance to a casual observer or an eavesdropper not having the knowledge or the key to the encoding thereof.

A further objective of this invention is to provide an improved technique for generating a controlled pseudorandom noise signal.

Other objects and many of the attendant advantages of this invention will be readily appreciated as the same becomes better understood by reference to the following detailed description when considered in conjunction with the accompanying drawings and wherein:

FIG. 5 is a block diagram of a more sophisticated embodiment of a digital message encoder that may be incorporated in the subject invention as it is represented by the device of FIG. 2.

FIG. 6 is a diagrammatical-pictorial view of the vessels involved to show how secure communication signals and echo-ranging signals are broadcast to a friendly communication vessel and a target respectively at the same time.

Figure 1:
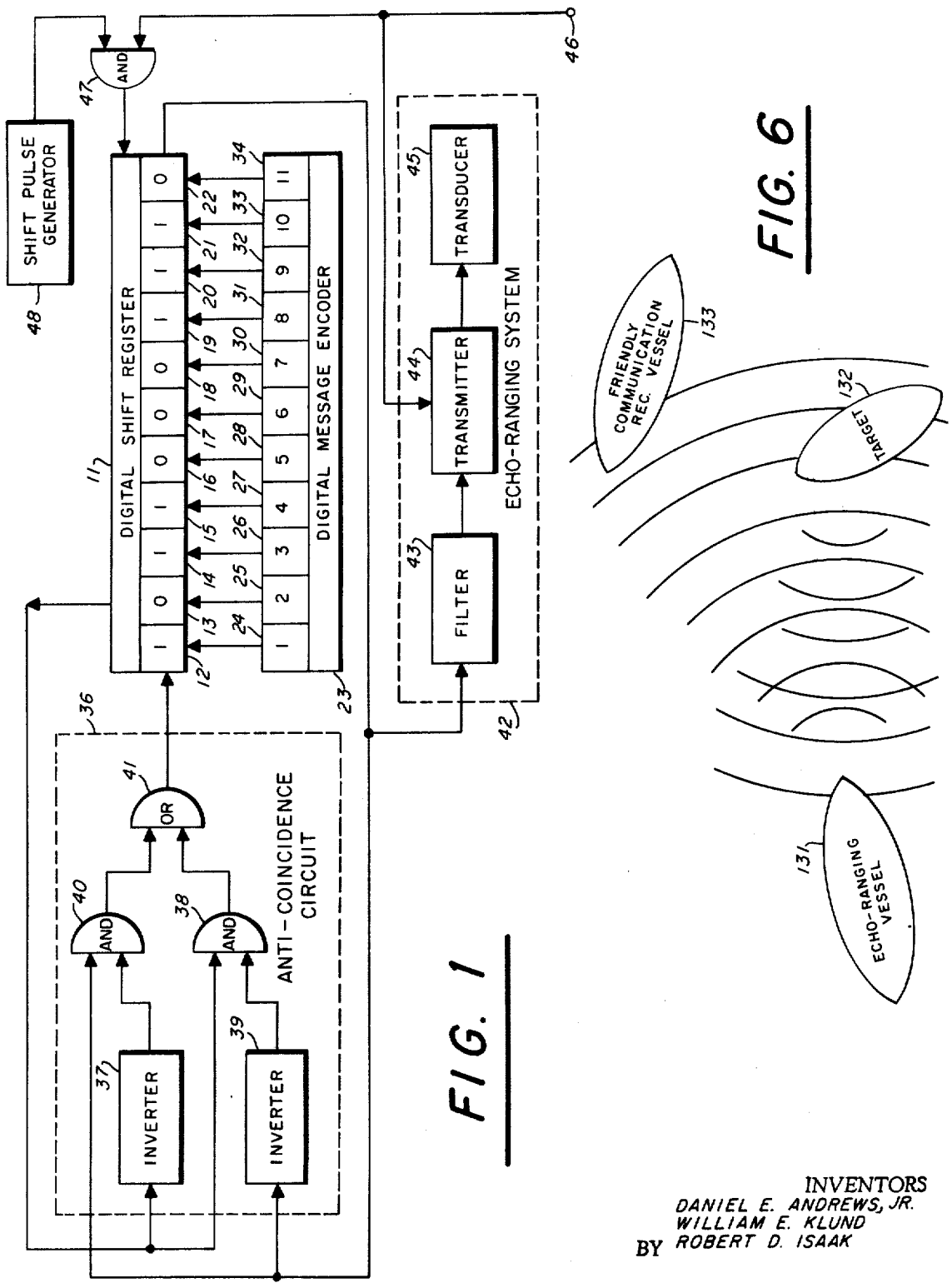
FIG. 1 is a block diagram representation of the subject encoded echo-ranging signal generator constituting this invention.

Referring now to FIG. 1, which depicts the basic inventive concept of the device constituting this invention, there is shown pseudorandom signal generator such as digital shift register 11 having a plurality of stages 12 through 22 each of which is so designed as to contain a binary bit represented herewith as a 1 or 0 at any given instant. For example, in the digital shift register shown, stages 12 through 22 contain binary bits represented as 1, 0, 1, 1, 0, 0, 0, 1, 1, 1, and 0, respectively.

Connected to digital shift register 11 is a digital message encoder (specifically a device to control the starting code of the shift register) having a like plurality of stages 24 through 34 which are connected to stages 12 through 22, respectively for the purpose of setting a predetermined program of zeros and ones in accordance with some cryptographic message number. Digital message encoder 23 may be actuated manually or by some other associated equipment as desired. The important feature, regardless of how it is actuated, is that it programs each stage of digital shift register 11 with a 1 or a 0 in accordance with a predetermined plan or program.

Digital shift register 11 has a pair of outputs and an input with one of said outputs being the output of the last stage or in this case stage 22, and the other output from the second stage or stage 13. The input is applied to the first stage 12 of the digital shift register. Interposed between said outputs and said input, is an anticoincidence circuit 36. Actually the outputs of digital shift register 11 are applied to a plurality of inputs of anti-coincidence circuit 36. The output of stage 13 is applied to the input of an inverter 37 and to one of the inputs of an AND gate 38. The output of stage 22 is applied to the input of an inverter 39 and one of the inputs of an AND gate 40. The outputs of inverter 37 and 39 are applied to the other inputs of AND gates 40 and 38. The outputs of AND gates 40 and 38 are applied to the inputs of an OR circuit 41, which, in turn, has its output applied to the input of stage 12 of digital shift register 11. Inverter 37, AND gate 38, inverter 39, AND gate 40, and OR circuit 41 constitute the aforementioned anti-coincidence circuit 36.

The output of stage 22 of digital shift register 11 constitutes the output of the subject encoder echo-ranging signal generator portion of this invention. In order to effect a broadcast of the output signals, they are applied to the input of an echo-ranging system which, for example, may be a sonar system, radar system, communication system, or any other type of system where cryptographic information is broadcast throughout a predetermined environmental medium for security purposes. In this particular case, the output of digital shift register 11 is applied to the input of a filter 43 which, in turn, has its output connected to a transmitter 44 for the proper processing thereof in accordance with the operational circumstances involved. The output of transmitter 44 is applied to a transducer 45 which is suitable for broadcast of energy throughout the environmental medium involved in any given instant. In this particular case, the invention is exemplified and defined as a sonar transmitter and transducer, and, hence, transducer 45 would be of the electroacoustical type. In event the subject system is being used in connection with radar, said transmitter and said transducer would be a portion of the radar system, transducer 45 being a radar antenna. It would appear to be obvious to anyone skilled in the art having the benefit of applicants' teachings presented herewith to make the necessary design changes to effect either a sonar system or a radar system or any other type of system required for any given operational circumstances, since so doing would obviously be only a matter of design choice of the associated echo-ranging apparatus involved, the selection of which would obviously be contingent upon the environmental medium within which it is to operate.

In order to actuate the subject invention, a transmitting keying pulse input is applied to an input terminal 46. This pulse may be applied manually or by other suitable associated equipment. Input terminal 46 is coupled to the aforesaid transmitter 44 for timely enabling it and also to one of the inputs of a switching means such as, for example, an AND gate 47. The other input to AND gate 47 is supplied by the output of a shift pulse generator 48 which timely and effectively shifts the aforementioned digital shift register 11 because the output of AND gate 47 is coupled thereto.

Figure 2:
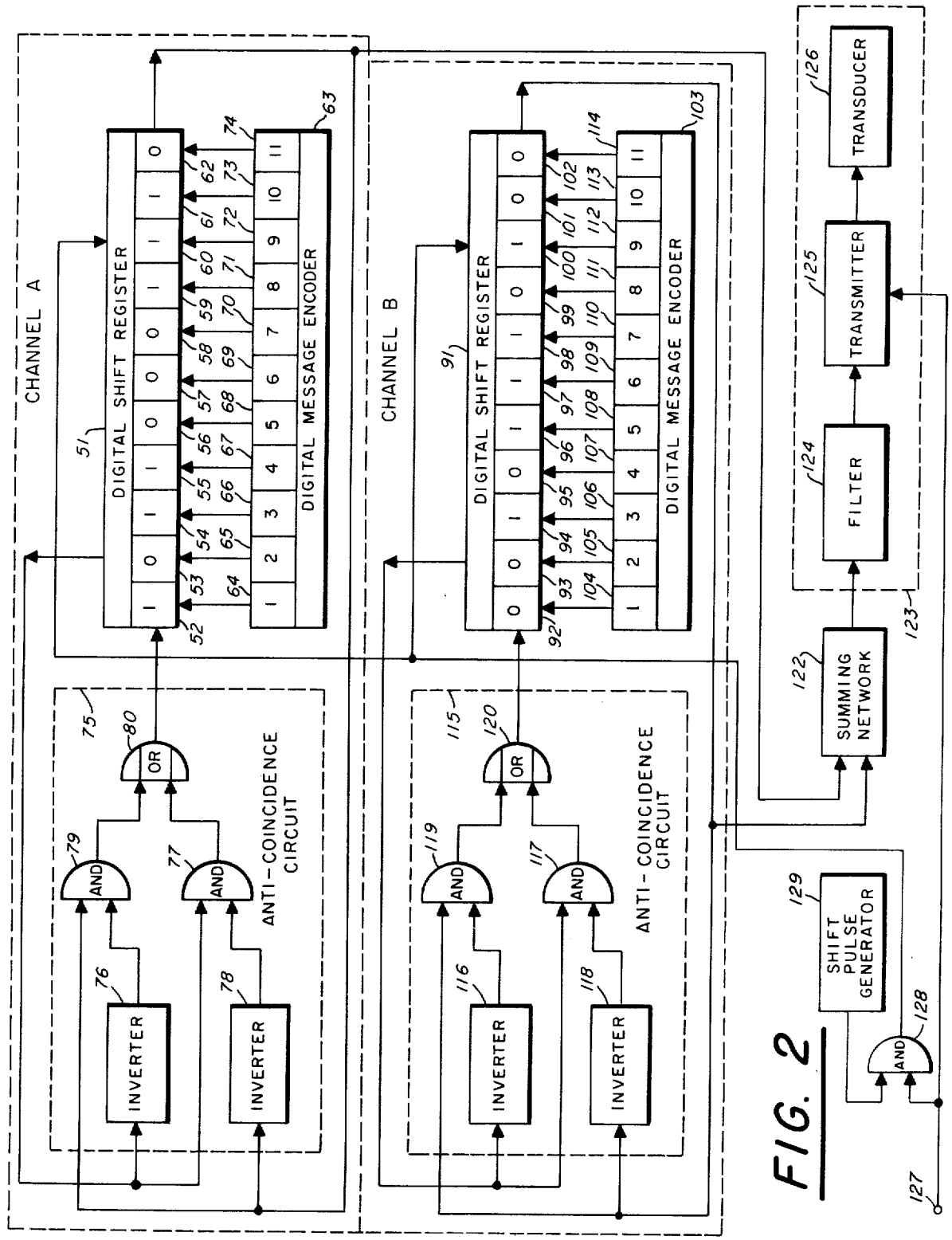
FIG. 2 is a block diagram representation of another embodiment of the encoded echo-ranging signal generator constituting this invention.

Referring now to FIG. 2, there is shown another embodiment of the subject invention as having a pseudorandom type of signal generator such as digital shift register 51 having a plurality of stages 52 through 62. Connected to said digital shift register 51 is a digital message encoder 63 having a large number of encoding stages 64 through 74. Each of said digital message encoder stages, of course, are respectively connected to digital shift register stages 52 through 62, whereby the latter may be set by the former to contain a plurality of binary bits herewith designated as "ones" and "zeros". Like digital shift register 11 of FIG. 1, digital shift register 51 of FIG. 2 contains a plurality of stages which are adapted for timely storing said binary bits and also adapted for timely and successively shifting the bits stored in each one thereof to and through successive stages until the final stage is reached. Again, digital shift register 51 is of the conventional type and, therefore, contains bistable multivibrator elements or elements more generically termed flip-flops, each of which is capable of being put into the one or zero state in accordance with any predetermined cryptographic program or plan.

Digital shift register 51 has a pair of output signals which are obtained from the second stage thereof (herewith referenced as stage 53) and the last stage thereof (herewith reference as stage 62). As before, these output signals are applied to the inputs of an anti-coincidence circuit 75. The output of stage 53 is, thus, seen to be connected to the input of a logical inverter 76 and to one of the inputs of an AND gate 77 while the other output of digital shift register 51 emanating from the last stage thereof is applied to the input of another logical inverter 78 and to one of the inputs of an AND gate 79. The outputs of inverter 76 and 78 are respectively applied to the other inputs of said AND gates 79 and 77. And the outputs of said AND gates 79 and 77 are then applied to the pair of inputs of an OR circuit 80, the output of which is fed to the first stage of digital shift register 51, which, of course, in this case, is the first stage thereof and herewith referenced as stage 52.

In this particular embodiment, it should be noted that there are a pair of channels, herewith referenced as channels A and B, and it should be considered that each of the aforementioned elements with respect to FIG. 2 constitutes the elements which comprise channel A of said channels. Although only a pair of channels are herewith disclosed in this embodiment, it should be understood that any number may be incorporated in the subject invention as desired to produce the desired cryptographically encoded signal as the output therefrom. Also, although not absolutely necessary, the device of FIG. 2 illustrates that the second channel thereof is substantially identical to the aforementioned first channel, but this need not necessarily be so, since the output signal wanted is the determining factor.

Said second channel B is disclosed as having a pseudorandom type of signal generator such as digital shift register 91, having a plurality of stages 92 through 102. And these stages, of course, function in a similar manner and designated in both of the aforementioned digital shift registers 11 and 52. Likewise, connected to digital shift register 91 is a digital message encoder 103 having a similar number of stages 104 through 114, and each thereof is respectively connected to the aforesaid stages 72 through 102 of digital shift register 91.

Again, a pair of outputs emanate from digital shift register 91 from the second stage thereof (herewith referenced as stage 93) and the last stage thereof (herewith referenced as stage 102), and these outputs are also applied to the inputs of another anti-coincidence circuit 115. The output of stage 93, of course, is applied to the input of a logical inverter 116 as well as to one of the inputs of an AND gate 117, while the output of stage 102 of digital shift register 91 is applied to the input of a logical inverter 118 and one of the inputs of an AND gate 119. The outputs of logical inverters 116 and 118 are then respectively applied to the other inputs of said AND gates 119 and 117. Of course, the outputs thereof are applied to a pair of inputs of an OR circuit 120, the output of which is applied to the input of the first stage (herewith designated as stage 92) of the aforesaid digital shift register 91.

As in the digital shift register of FIG. 1, digital shift registers 51 and 91 of FIG. 2 likewise have the outputs taken from the last stage thereof and these outputs are applied to a pair of inputs of a summing network 122, the output of which is then supplied as the input of an echoranging system 123. Although the aforementioned network 122 is defined as a summing network, if so desired a switching network may be substituted therefor which alternately switches channels A and B for timely connection to the input of echo-ranging system 123. Actually, the input to echo-ranging system 123 is a filter 124 and the output thereof is fed through a transmitter 125 to a transducer 126. Obviously, echo-ranging system 123 may be of the sonar type, the radar type, some preferred communication type, or any other type as desired, similar to that mentioned above in connection with the explanation of echo-ranging system 42 of FIG. 1.

Like in the device of FIG. 1, the embodiment of the subject invention disclosed in FIG. 2 requires a transmitting keying pulse input to actuate it. Hence, this input pulse is applied to an input terminal 127 which, in turn, is coupled to transmitter 125 and one of the inputs of a switching means such as, for instance, an AND gate 128, the output of which is connected to transmitting digital shift registers 51 and 91 for the timely shifting thereof. Actually, said shifting is effected by a shift pulse generator 129 which is connected to the other input of AND gate 128.

Depending on the type of digital message encoder that is employed with this embodiment of the invention, it may be necessary, as will be discussed subsequently, to interpose an inhibit AND gate (not shown in FIG. 2; see FIG. 5) between shift pulse generator 121 and shift registers 51 and 91 of channels A and B for the timely actuation and deactuation thereof during the message encoding process. However, in event the operational speed of the oscillator of the digital message encoder used is great enough so that the shift rate of the message encoding process may be accomplished between the shift pulses of relatively low-speed shift pulse generator 121, inhibiting AND gate 127 and its associated flip-flop may be deleted. Accordingly, in view of the teachings herewith presented, it would be well within the purview of the artisan to make the necessary design changes to effect either of the aforesaid conditions as desired.

Figure 3:
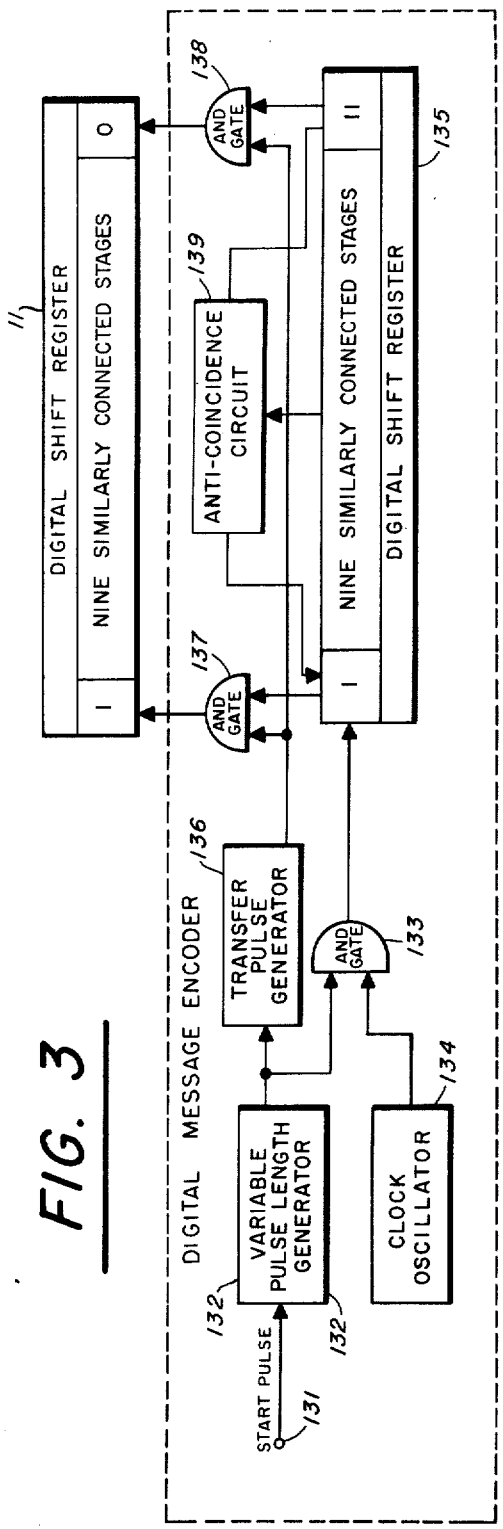
FIG. 3 is a block diagram of a simple, basic embodiment of a digital message encoder that may be incorporated in the subject invention.

Referring now to FIG. 3 there is shown a basic concept of the digital message encoder portion of this invention that may be used as digital message encoders 63 and 103 if so desired. This digital message encoder is shown as having a start pulse 131 being applied to a variable pulse length generator 132, the output of which is applied to one of the inputs of an AND gate 133 with the other input thereto being supplied by a high frequency clock oscillator 134. The output of AND gate 133 is applied as the shift pulses to an eleven stage, high speed encoder digital shift register 135 containing a predetermined binary reference program stored therein. The output of variable pulse length generator 132 is also applied to a transfer pulse generator 136, the output pulse of which is initiated at the end or lagging edge of the variable pulse signal from generator 132. This transfer pulse is the one applied to one of the inputs of AND gates 137 and 138. The other inputs to said AND gates 137 and 138 are respectively supplied by stages 1 and 11 of digital shift register 135 and, of course, the output of said AND gates 137 and 138 are applied to the inputs of the first and last stages of the aforementioned digital shift register 11, which, of course, is the digital shift register depicted in FIG. 1. Although only a pair of AND gates, such as AND gates 137 and 138, are shown in FIG. 3 as interconnecting only a pair of stages of digital shift registers 135 and 11, it should be understood that each of the stages thereof are respectively interconnected in a similar manner and with one of the inputs thereof being supplied by variable pulse length generator 132 through transfer pulse generator 136.

Although the digital message encoder illustrated in FIG. 3 is primarily intended to be very basic in concept and also primarily intended to be used in conjunction with the device of FIG. 1, it should be understood that it may also be incorporated in the device of FIG. 2 if a pair thereof is respectively associated with digital shift registers 51 and 91 of channels A and B.

An anti-coincidence circuit 139 is connected to encoder digital shift register 135 in a way similar to the way anti-coincidence circuit 36 is connected to transmitting digital shift register 11. Of course, the elements making up anti-coincidence circuit 139 are likewise substantially identical to those comprising anti-coincidence circuit 36. As will be explained subsequently, this particular structural configuration enables comparable operation to occur with respect to both of the aforementioned anti-coincidence circuits and their associated apparatus.

Figure 4:
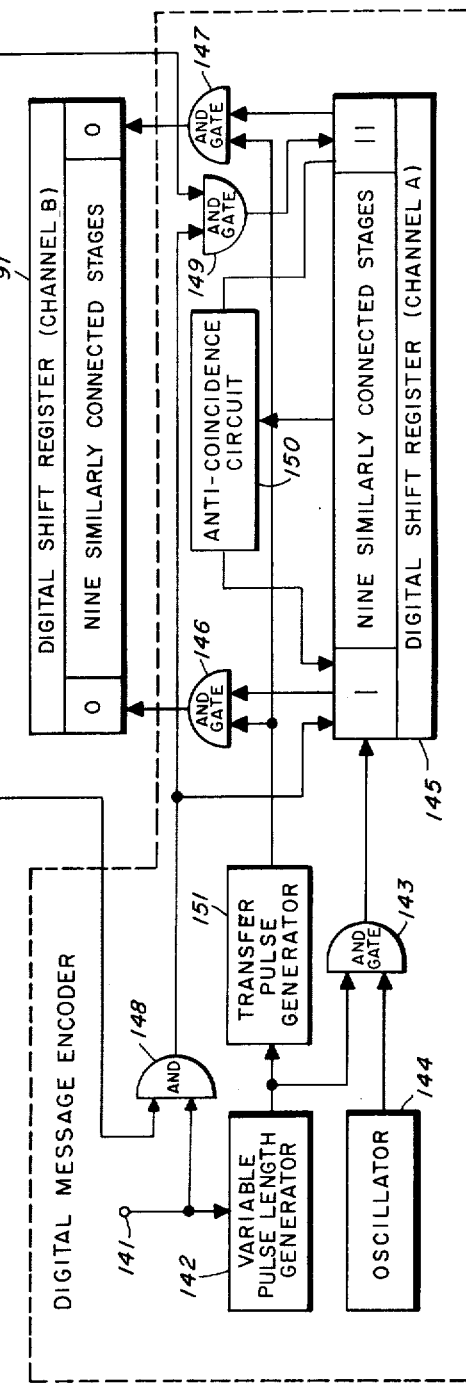
FIG. 4 is a block diagram of another basic embodiment of a digital message encoder that may be incorporated in the subject invention as it is represented in FIG. 2.

FIG. 4 discloses another fairly basic embodiment of a digital message encoder that may also be incorporated in the invention as it is disclosed in the device of FIG. 2. Again a start pulse 141 is applied to a variable pulse length generator 142, the output of which is applied to an AND gate 143. The other input to said AND gate is supplied by a high frequency clock oscillator 144 and the output of AND gate 143 is applied as the shift pulses to a high speed eleven stage digital shift register 145. Each of the stages of said digital shift register 145 are so interconnected to the respective stages of digital shift register 51 of channel A to timely receive the binary contents thereof as will be further explained below. Once received, the contents are then stored in said digital shift register 145 and again transferred through AND gates 146 and 147 (as well as the other AND gates interconnecting the nine remaining similar stages but not shown in this figure in order to keep it as simple as possible). Thus, the outputs of digital shift register 145 are respectively applied to the other inputs of said AND gates 146 and 147 and the others, as well, in order to effect said transfer of the contents of shift register 145 into the respective stages of digital shift register 91. In order to effect the aforementioned transfer of the contents of transmitting digital shift register 51 to encoder digital shift register 145, a plurality of AND gates interconnect the respective stages thereof. For the purpose of simplicity, only AND gates 148 and 149 are shown as being so connected between shift registers 51 and 145, and these AND gates are also connected to a transfer pulse generator which, in turn, is connected to receive the output of variable pulse length generator 142.

An anti-coincidence circuit 150 is likewise connected to encoder digital shift register 145 in a manner similar to that described above in conjunction with FIG. 1 and for similar reasons.

Considering now the embodiment of a more sophisticated digital message encoder, as it is depicted in FIG. 5, it can be seen that this device also contains a start pulse which is applied to the input of a counter 152. A high speed clock oscillator 153 likewise provides said counter with a high frequency signal and at the same time also supplies said high frequency signal to an AND gate 154. The output of AND gate 154 is, of course, applied as the shift pulse to a high-speed encoder digital shift register 155. The output of counter 152 is then applied to the input of a pattern detector 156 which is actually a variable pulse length generator that produces a pulse length that is porportional to some particular input message number. The output of pattern detector 156 is then applied as one of the inputs to a flip-flop 157, the other input of which is supplied by the aforesaid reset pulse from computer 152. The start pulse is also applied to one of the inputs of an AND gate 158, with the other input thereto and the output thereof respectively interconnecting one of the stages the aforesaid digital shift register 51 of channel A and one of the stages of high speed digital shift register 155. The output of flip-flop 157 is applied to several components, one of which is the other of the inputs to said AND gate 154, and another of which is fed through a transfer pulse generator 160 to an AND gate 161. The other input of AND gate 161 is received from said stage of encoder digital shift register 155 and the output thereof is applied to the respective stage of digital shift register 91 of channel B. Of course, as previously mentioned, in the event the timing of the digital message encoder and the subject respective channels of this invention are such that an AND gate 127 must be used, the output of flip-flop 157 provides the inhibit inputs of said AND gate 127, while the other input thereto is supplied by the aforesaid shift pulse generator 121. The output of AND gate 127 then supplies the shift pulses to digital shift registers 51 and 91 of channels A and B respectively. Although not shown in FIG. 5, digital shift registers 51, 91, associated summing network 122, and echo ranging system 123 are connected in a manner similar to that disclosed in the device of FIG. 2 but the details thereof are herewith omitted for the purpose of simplicity of disclosure at this particular time, inasmuch as the discussion of FIG. 5 is allocated for the most part to the disclosure of one of the preferred embodiments of a digital message encoder that may be so combined with the invention as it is illustrated in FIG. 2.

Encoder digital shift register 155 has a block representation of an anti-coincidence circuit 162 connected thereto in the same way that anti-coincidence circuits 75 and 115 are respectively connected to digital shift registers 51 and 91 of channels A and B shown in FIG. 1. For the sake of simplicity of disclosure, anti-coincidence circuits 75 and 115 are represented by similarly connected blocks of the digital shift registers 51 and 91 as they are exemplarily depicted in FIG. 5. All of these anti-coincidence circuits are, of course, used for the same reasons given previously; that is, to effect continuous operation of their respective shift registers. This, of course, effects a simplified disclosure of channels A and B and their associated summing network and echo-ranging system, shown in more detail in FIG. 2.

Briefly, the operation of the subject invention as embodied in the device depicted in FIG. 1 will now be discussed in connection with the device of FIg. 3 as follows:

An original program is fed into digital shift register 11 by setting a one or zero in each stage thereof in accordance with a prearranged plan, program, or code which, in turn, causes a cryptographically encoded signal to emanate as the output signal of the invention. This output signal is of such complex waveform that it sppears to be mere sea noise or the like and makes it substantially impossible to decode without having the key thereto and the proper decoding equipment associated therewith. Said original program may, of course, be manually set into digital shift register 11 by placing the respective stages thereof in the desired one or zero state by proper tapping or proper bias voltage application or, preferably, it may be accomplished by a digital message encoder which acts as an intervening link that facilitates the presetting of the state of each stage thereof as desired.

Such a digital message encoder is depicted in FIG. 3 and now will be discussed from an operational standpoint. If an initial start pulse is used to cause a binary pulse to be formed in such manner that the duration or length thereof is directly proportional to some given message (herewith designated as having some message number to distinguish it from some other messages likewise having their own particular number), said binary signal may be used to gate other binary information from the stages of one shift register into the respective stages of another shift register. In this case, such a signal is generated by variable pulse length generator 132, and the length thereof is made proportional, as previously mentioned, to some predetermined message. This signal is then applied along with the pulses from high speed oscillator 34 to AND gate 133, and when there is coincidence therebetween, a signal emanates from AND gate 133, causing the shifting or running of encoder high speed shift register 135. As this shifting occurs, all the stages thereof respectively apply their zero or one contents to exemplary AND gates 137 and 138 as well as the AND gates (not shown) connected to the nine stages intermediate thereto. And when the aforementioned message signal lagging edge occurs at the output of variable pulse length generator 132, transfer pulse generator 136 produces a pulse which causes said AND gates to transfer the zero and one contents of shift register 135 into the respective stages of digital shift register 11 or one of the transmitting digital shift registers of FIG. 2, depending on which embodiment is being used at the time.

In the event the device of FIG. 2 is being used, a pair of such digital message encoders would be required or, in the alternative, the type of digital message encoder illustrated in either FIG. 4 or FIG. 5 may be so employed. In either case, delay period or phase relationship between the contents of the aforesaid high speed digital message encoder and its receiving low speed transmitting digital shift register is proportional to the particular message being sent at any particular instant, and when a friendly receiving vessel has the key to such message delays or phase relationships, communication will be properly effected.

Once the digital shift register 11 is loaded or programmed by the digital message encoder selected, the binary bits contained therein are further processed to provide the pseudorandom noise appearance in the output signal and this signal constitutes the output of the subject invention.

Depending upon the type encoding wanted in said output, a pair of process signals are fed back through a pair of recirculation loops. For instance, the basic preferred embodiment shown in FIG. 1 discloses one of said pair of feedback signals as coming from the second stage and the other coming from the last stage of digital shift register 11. Considering, for instance, the feedback output signal from the second stage, it can be seen that it is applied to logical inverter 37 and to one of the inputs of AND gate 40. If this signal is converted to the polarity necessary for the actuation of AND gate 40 when another signal of like polarity is applied thereto a one or zero will emanate from AND gate 40 depending on said polarity and whether or not it has been predesigned as a one or zero in accordance with the definition of the states of the second stage (herein referred to as stage 13) and the last stage (hereinafter referred to as stage 22), respectively. Thus, for example, if a zero type of signal is applied to inverter 37, it is logically inverted to a one type signal and passed on to one of the inputs of AND gate 40. Then, if a one signal occurs at the same time at the last stage of the digital shift register, this one signal is applied to the other input of AND gate 40 simultaneously or in coincidence with the one signal from inverter 37, thereby causing a one type signal to be applied to one of the inputs of OR circuit 41. Of course, if the polarities of said signals are not in the proper coincidence, AND gate 40 is not actuated or opened and no output signal emanates therefrom. But if they are, as in the present example, a one will be applied to the input stage 12 of the digital register for the timely storage therein before being passed through successive stages thereof, as it is timely shifted by shift pulse generator 48. Thus, it can be seen that inverter 37, AND gate 40, and OR circuit 41 constitute one electrical path through anti-coincidence circuit 36, while inverter 49, AND gate 38 and OR circuit 41 constitute another such path.

Obviously, if the polarities of each of the aforementioned digital shift register outputs are opposite to those mentioned above, the paths consisting of logical inverter 39, AND gate 38, and OR circuit 41 will be the active path. This is true because AND gate 38 will thus have the proper coincidence signals applied thereto and a zero signal will pass through OR circuit 41 and on into the first stage of digital shift register 11.

As these one and zero signals are shifted through the stages of the digital shift register 11 an almost infinite number of known or predetermined combinations and permutations may be obtained therein, depending on the number of stages it contains and the respective stages from which said pair of outputs are taken. Hence, as the complexity thereof increases, the complexity and noise-like appearance of the output signal from the digital shift register portion of the invention also increases. The shifting of transmitting digital shift register 11, of course, is effected by shift pulse generator 48 when gate 47 is opened by the application of a transmitting keying pulse input. As can readily be seen, when gate 47 is open, transmitter 44 is operated to effect the broadcast of energy by transducer 45. To obtain the desired coding to be incorporated in the broadcast energy for security purposes (regardless of complexity), it would merely involve the design choice of the artisan to properly select stages of shift register 11 and the shift register stages of digital message encoder 23, that is, their respective states and the number thereof, and the stages from which said outputs for feedback are obtained.

The output of the last stage (stage 22) also constitutes the output of the encoded echo-ranging signal generator portion of this invention. This, then, is the signal that is applied as the input to echo-ranging system 42 for further processing as necessary to give it the proper shape, power, and physical characteristics for broadcast throughout the environmental medium being used at any given time. If, for example, said medium is sea water or the like, said echo-ranging system would be a sonar system in which filter 43 would be effective within some predetermined acoustical frequency range, said transmitter 44 would be a sonar transmitter, and said transducer 45 would be an appropriate electroacoustical sonic or pressure energy projector. Likewise, if echo-ranging system 42 were a radar system, the aforesaid filter, transmitter, and transducer would be selected to have the proper frequencies and operational characteristics. Thus, transmitter 44 would be a radar transmitter, and transducer 45 would probably be some suitable sort of antenna.

The operation of the device of FIG. 2 is, as far as the digital shift registers, digital message encoders, and anti-coincidence circuits are concerned, substantially the same as that of the device of FIG. 1. In this particular embodiment, however, it can readily be seen that two sets of said elements are combined to form a pair of encoded echo-ranging signal generating channels A and B, each of which is timely shifted by shift pulse generator 129 and each of which had their respective outputs applied as a pair of inputs to summing network 122. This arrangement, of course, considerably increases the number of combinations and permutations of binary signals that may be obtained for cryptographic purposes which, in turn, increases the number of messages possible and the noise-like appearance thereof.

Although only two of such channels are herewith shown in FIG. 2, any number thereof that may be necessary to provide the type of cryptographic binary output signal wanted may be incorporated within this invention, since so doing would obviously be well within the purview of one skilled in the art having the benefit of the teachings herewith presented. Of course, said summing network (or switching network, as the case may be) would obviously require the same number of inputs as there are channels within the subject generator, in order that the proper addition thereof may be effected.

In the case of the bi-channel embodiment of the subject invention, other and more sophisticated versions of the digital message encoder may be used. Thus, the devices of FIGS. 4 and 5 may be employed as appropriate.

The device of FIG. 4 is the more basic of the two and consists of high-speed clock oscillator 144 and variable pulse length generator 142, the output of which is gated by AND gate 143 to timely effect the shifting of digital shift register 145. At the appropriate time, said digital shift register 145 transfers the contents thereof through the respective AND gates to the respective stages of digital shift register 91. This gating transfer, of course, is timely effected in accordance with the length of the pulse emanating from the variable pulse length generator and the lagging edge pulse from transfer pulse generator 151, and, as previously, said pulse length, in turn, is contingent upon some corresponding key message desired to be sent. Once the digital shift register of channel B is loaded or programmed with a delayed version of the contents of shift register 51 of channel A, the further processing thereof within each of said respective channels may be effected as described above in connection with the device of FIG. 1.

The digital message encoder of FIG. 5 operates to produce substantially the same result as that of FIG. 4; however, as can be seen, it is a more detailed version thereof. Although oscillator 153, AND gate 154, and high-speed encoder digital shift register 155 operates substantially the same as before, the variable pulse length generator may be considered to comprise counter 152, pattern detector 156, and flip-flop 157. The operation of this device, then, consists of supplying the start pulse to counter 152 which counts the frequency of the cycles emanating from oscillator 153 and passes said signals on to pattern detector 156 for the generation of an elongated binary waveform, the length of which is proportional to the message desired to be sent. In other words, pattern detector 156 merely creates a signal or a pulse whose length literally represents a particular predetermined message. This pulse, of course, may have its length controlled manually or by any suitable equipment associated with but not necessarily a part of the subject invention. The start pulse is also applied to one of the inputs of flip-flop 157 to timely set it in a ready state, and when the reset pulse input thereto is supplied by pattern detector 156, flip-flop 157 changes state for the duration of said elongated waveform, thereby generating or producing an output signal which is the binary equivalent of the aforesaid elongated signal. Prior to this, the aforesaid start pulse also opens AND gate 158 and all of the other similar AND gates (not shown) respectively interconnecting the stages of transmitting digital shift register 51 and high-speed encoder digital shift register 155 to transfer the contents thereof thereto. AND gate 161 is also open along with all of the other similar AND gates (not shown) connected between the respective stages of shift register 155 and shift register 91 by means of the lagging edge pulse produced by transfer pulse generator 160 as a result of the aforesaid binary waveform being applied thereto. Although for the purpose of simplifying this disclosure only the last stages of each of the aforesaid shift registers are shown to be interconnected as above by a pair of binary bit transfer AND gates, it will readily be understood from the foregoing statements that each of the stages thereof likewise is interconnected by its own similar pair of binary bit transfer gates.

When the transfer of binary signals is occuring between said digital shift registers, inhibit AND gate 127 is closed. But, during the remaining time period of the aforesaid predetermined elongated binary signal from flip-flop 157, inhibit AND gate 127 is set to the open state. Hence, the contents of shift register 51 are timely transferred to digital shift register 91, with the delay therebetween corresponding to the aforesaid key message number. Of course, as in all the embodiments of this invention, recirculation and further processing within each channel and its respective anti-coincidence circuit timely effects repetition of the original programmed or encoded sequence cycle within the associated digital shift register in order to provide continuous operation if so desired.

The output of summing network 121 is then applied to echo-ranging system 123 which contains filter 124, transmitter 125 and transducer 126 in a manner already described in connection with the similarly shown system illustrated in FIG. 1. It should, likewise be understood that echo-ranging system 123 may also be one of the many types mentioned in connection with the explanation of the device of FIG. 1 or any suitable type which provides optimum operation within any given environmental medium or any given environmental circumstances or conditions.

With the exception of the digital message encoder portion of this invention, each of the foregoing elements incorporated in the block diagrams in FIGS. 1 and 2 are known and conventional in the art per se, and that it is their presently disclosed arrangement, interconnection, and interaction which constitutes the subject invention and produces the new and improved results obtained. Likewise, of course, the blocks of FIGS. 3 through 5 are also conventional in the art and it is their respective arrangement which is new and unique, as far as this invention is concerned.

Referring now to FIG. 6, the view shown therein is intended to disclose generally how the subject invention may be used to an advantage during such maneuvers as tactical maneuvers doing combat operations between a pair of friendly vessels and an enemy target. Simply, the operation consists of one friendly vessel 131 using its echo-ranging system to echo-search an enemy target 132 while the signal used therefor also travels to a second friendly vessel 133 with which it is desirable to communicate at that time. The echo signal actually broadcast is of such binary complexity that for all practical purposes it appears to be noise to the aforesaid target, in the event it is monitoring such echo-ranging signals. And in the event the target actually does recognize said echo-ranging signal as being what it is, the encoding thereof is so complex as to make it practically impossible to decipher at all, let alone within the time necessary to take advantage of the message contained therein during tactical combat maneuvers. However, because said friendly communicating vessel receiving said echo-ranging signal has equipment available for automatically decoding it, communication therebetween may be effected to an advantage during said tactical combat maneuvers. Consequently, the desired result of echo-ranging on an enemy target and communicating with a friendly vessel at the same time is effected to the considerable benefit of said friendly vessels and to the probable detriment of said enemy target vessel.

obviously many modifications and variations of the present invention are possible in the light of the above teachings. It is, therefore, to be understood that within the scope of the appended claims the invention may be practiced otherwise than as specifically described.

What is claimed is:
1. An encoded echo-ranging signal generator comprising in combination;
    a digital shift register having a plurality of binary encoded stages,
    a shift pulse generator coupled to said digital shift register for the timely shifting thereof,
    an anti-coincidence circuit having a pair of inputs and an output with one of said inputs being connected to a predetermined stage of said digital shift register and the other input thereof coupled to the output of said digital shift register and with the output thereof connected to the input of said digital shift register, to randomly recirculate through said register the binary contents of said encoded stages, an echo-ranging system coupled to the output of said digital shift register, and a digital message encoder coupled to said digital shift register for the respective binary bit encoding of each stage thereof.

2. An encoded echo-ranging signal generator comprising in combination, a first digital shift register having a plurality of binary encoded stages, a first anti-coincidence circuit having a pair of inputs and an output with one of said inputs being connected to a predetermined stage of said first digital shift register and the other input thereof coupled to the output of said first digital shift register and with the output thereof connected to the input of said first digital shift register, a second digital shift register having a plurality of binary encoded stages, a second anti-coincidence circuit having a pair of inputs and an output with one of said inputs being connected to a predetermined stage of said second digital shift register and the other input thereof coupled to the output of said second digital shift register and with the output thereof connected to the input of said second digital shift register, a shift pulse generator coupled to each of said first and second digital shift registers for the timely shifting thereof, and a summing network having a pair of inputs and an output with said pair of inputs respectively coupled to the outputs of said first and second digital shift registers.

3. The device of claim 2 wherein said first and second anti-coincidence circuits each comprise;

a first inverter, a second inverter, a first AND gate having a pair of inputs one of which is coupled to the output of said first inverter, a second AND gate having a pair of inputs one of which is coupled to the output of said second inverter, and an OR circuit having a pair of inputs and an output with said pair of inputs respectively connected to the outputs of said first and second AND gates.

4. An encoded echo-ranging signal generator comprising in combination;

a first digital shift register having a plurality of binary encoded stages, a first anti-coincidence circuit having a pair of inputs and an output with one of said inputs being connected to a predetermined stage of said first digital shift register and the other input thereof coupled to the output of said first digital shift register and with the output thereof connected to the input of said first digital shift register, a second digital shift register having a plurality of binary encoded stages, a second anti-coincidence circuit having a pair of inputs and an output with one of said inputs being connected to a predetermined stage of said second digital shift register and the other input thereof coupled to the output of said second digital shift register and with the output thereof connected to the input of said second digital shift register, a shift pulse generator coupled to each of said first and second digital shift pulse generators for the timely shifting thereof, and a summing network having a pair of inputs and an output with said pair of inputs respectively coupled to the outputs of said first and second digital shift registers, a first digital message encoder coupled to said first digital shift register for binary bit encoding of each stage thereof, and a second digital message encoder coupled to said second digital shift register for binary bit encoding of each stage thereof.

5. An encoded echo-ranging signal generator comprising in combination;

a first digital shift register having a plurality of binary encoded stages, a first anti-coincidence circuit having a pair of inputs and an output with one of said inputs being connected to a predetermined stage of said first digital shift register and the other input thereof coupled to the output of said first digital shift register and with the output thereof connected to the input of said first digital shift register, a second digital shift register having a plurality of binary encoded stages, a second anti-coincidence circuit having a pair of inputs and an output with one of said inputs being connected to a predetermined stage of said second digital shift register and the other input thereof coupled to the output of said second digital shift register and with the output thereof connected to the input of said second digital shift register, a shift pulse generator coupled to each of said first and second digital shift pulse generators for the timely shifting thereof, a summing network having a pair of inputs and an output with said pair of inputs respectively coupled to the outputs of said first and second digital shift registers, and an echo-ranging system connected to the output of the aforesaid summing network.

6. The device of claim 5 wherein said echo-ranging system connected to the output of the aforesaid summing network comprises;

a bandpass filter, a transmitter coupled to the output of said bandpass filter, and a transducer connected to the output of the aforesaid transmitter.

7. An encoded echo-ranging signal generator comprising in combination;

a first digital shift register having a plurality of binary encoded stages, a first anti-coincidence circuit having a pair of inputs and an output with one of said inputs being connected to a predetermined stage of said first digital shift register and the other input thereof coupled to the output of said first digital shift register and with the output thereof connected to the input of said first digital shift register, a second digital shift register having a plurality of binary encoded stages, a second anti-coincidence circuit having a pair of inputs and an output with one of said inputs being connected to a predetermined stage of said second digital shift register and the other input thereof coupled to the output of said second digital shift register and with the output thereof connected to the input of said second digital shift register, a shift pulse generator coupled to each of said first and second digital shift pulse generators for the timely shifting thereof, a summing network having a pair of inputs and an output with said pair of inputs respectively coupled to the outputs of said first and second digital shift registers, a first digital message encoder coupled to said first digital shift register for binary bit encoding of each stage thereof, a second digital message encoder coupled to said second digital shift register for binary bit encoding of each stage thereof, and an echo-ranging system connected to the output of the aforesaid summing network.

8. The device of claim 7 wherein said echo-ranging system connected to the output of the aforesaid summing network comprises;

a filter, a sonar transmitter coupled to the output of said filter, and a sonar transducer connected to the output of said sonar transmitter.

9. A cryptographic signal generator comprising in combination;

means for sequentially shifting a pre-stored plurality of binary bits, a recirculating feedback system including logic means connected to said binary bit shifting means for predetermining which stored binary bit is to be fed back as the input thereto, means coupled to said binary bit shifting means for timely effecting the shifting thereof, means connected to said shifting means for programming the plurality of binary bits pre-stored therein, and means connected to the output of said shifting means for broadcasting the output signals shifted therefrom throughout a predetermined environmental medium.

10. The device of claim 9 wherein said means connected to the output of said shifting means for broadcasting the output signals shifted therefrom throughout a predetermined environmental medium comprises;

a bandpass filter, a transmitter coupled to the output of said bandpass filter, and a transducer connected to the output of said transmitter.

11. An encoded signal generator comprising in combination;

a digital shift register having a predetermined plurality of stages for respectively storing a like plurality of programmed binary bits therein, means for loading a plurality of programmed binary bits respectively in the plurality of stages of said digital shift register for storage thereof in accordance with a cryptographic code, a first inverter connected to the output of a predetermined one of said plurality of stages of the aforesaid digital shift register, a second inverter connected to the output of the last stage of the aforesaid digital shift register, a first AND gate having a pair of inputs and an output with one of the inputs thereof coupled to the output of said first inverter and the other input thereof coupled to the output of said last stage of said plurality of stages of the aforesaid digital shift register, a second AND gate having a pair of inputs and an output with one of the inputs thereof coupled to the output of said second inverter and the other output thereof coupled to the output of said one predetermined stage of said plurality of stages of the aforesaid digital shift register, an OR circuit having a pair of inputs and an output with one of the inputs thereof coupled to the output of said first AND gate and the other input thereof coupled to the output of said second AND gate and the output thereof connected to the input of the aforesaid digital shift register, and a shift pulse generator connected to said digital shift register for the timely shifting thereof.

12. The device of claim 11 wherein said means for loading a plurality of programmed binary bits respectively in the plurality of stages of said digital shift register for storage thereof in accordance with a cryptographic code comprises a plurality of digital message encoders.

13. The invention according to claim 11 further characterized by an echo-ranging system coupled to the aforesaid digital shift register for effectively broadcasting the output therefrom throughout a predetermined subaqueous medium.

14. An encoded echo-ranging signal generator comprising in combination, shift register means having a plurality of stages for respectively storing predetermined binary bits therein, means coupled to said shift register means for respectively loading programmed binary bits in each of the plurality of stages thereof, anti-coincidence means connected to said shift register means for appropriately feeding back predetermined binary bits from predetermined outputs thereof to the input thereof, means connected to said shift register means for the timely shifting thereof, and means connected to the output of the aforesaid shift register means for effectively transmitting the output therefrom throughout a predetermined environmental medium.

15. An encoded echo-ranging signal generator comprising in combination;

a plurality of digital shift registers each of which has a predetermined plurality of stages for respectively storing a like plurality of binary bits, a plurality of binary programming means respectively connected to said plurality of digital shift registers for timely and respectively loading the stages thereof with predetermined programmed sets of binary bits, a plurality of anti-coincidence logic means each of which has a pair of inputs and an output with one of said inputs of each thereof respectively connected to a predetermined one of the stages of said plurality of digital shift registers and the other input of each thereof respectively connected to the outputs of said plurality of digital shift registers and with the outputs thereof respectively coupled to the inputs of said plurality of digital shift registers, means connected to each of said plurality of digital shift registers for shifting same at a predetermined shifting rate, and means connected to the output of the aforesaid shift register means for broadcasting the outputs of said registers through a predetermined environmental medium.

16. The invention according to claim 15 further characterized by a summing network connected to the output of each of said plurality of digital shift registers.

17. The device of claim 16 further characterized by an echo-ranging system connected to said summing network for effectively broadcasting the output therefrom throughout a predetermined environmental medium.

18. A digital message encoder comprising in combination;

means for generating a pulse whose length represents a predetermined message, means for producing a signal of predetermined frequency, gating means coupled to the outputs of said pulse generating and signal producing means for producing a plurality of shift pulses when the inputs thereto are coincidental, a multi-stage encoder digital shift register coupled to the output of said gating means for shifting by said plurality of shift pulses, an anti-coincidence circuit coupled to said encoder digital shift register in such manner as to timely recirculate outputs therefrom as feedback input signals thereto for providing continuous output signals therefrom, a plurality of AND gates having a pair of inputs and an output with one of the inputs of each thereof respectively connected to each of the stages of said multistage encoder digital shift register and the outputs thereof adapted for being respectively connected to each of the stages of a transmitting digital shift register, and a transfer pulse generator interconnecting the output of said message representing pulse generating means and the other input to each of the aforesaid plurality of AND gates.

19. The device of claim 18 wherein said means for generating a pulse whose length represents a predetermined message comprises:

means for receiving a start pulse, a counter coupled to said start pulse receiving means, a pattern detector coupled to the output of said counter, and a flip-flop having a pair of inputs and an output with one of the inputs coupled to the output of said pattern detector and the other input thereof connected to the aforesaid start pulse receiving means.

20. The invention according to claim 19 further characterized by;

a second plurality of AND gates each of which has a pair of inputs and an output with one of the inputs of each thereof connected to said start pulse receiving means and the other input of each thereof adapted for being respectively connected to the stages of a second transmitting digital shift register and the outputs thereof respectively connected to each of the stages of said first mentioned transmitted digital shift register.

* * * * *